United States Patent [19]

Aoyagi et al.

[11] Patent Number: 4,575,682
[45] Date of Patent: Mar. 11, 1986

[54] CIRCUIT FOR ESTABLISHING ACCURATE SAMPLE TIMING

[75] Inventors: Hidehito Aoyagi; Botaro Hirosaki, both of Tokyo, Japan

[73] Assignee: NEC Corporation, Tokyo, Japan

[21] Appl. No.: 645,684

[22] Filed: Aug. 30, 1984

[30] Foreign Application Priority Data

Sep. 1, 1983 [JP] Japan ................. 58-160786

[51] Int. Cl.$^4$ .................. H03D 3/00; H03D 3/18
[52] U.S. Cl. ................... 329/50; 329/110; 329/122; 329/135; 375/39; 375/81; 455/214; 455/337
[58] Field of Search ............. 329/50, 110, 122, 135; 375/39, 80, 81, 94, 118, 120; 455/214, 337

[56] References Cited

U.S. PATENT DOCUMENTS 4,466,109 8/1984 Sari ............................. 375/39 X Primary Examiner—Eugene R. LaRoche
Assistant Examiner—D. C. Mis
Attorney, Agent, or Firm—Schwartz, Jeffery, Schwaab, Mack, Blumenthal & Evans

[57] ABSTRACT

In order to establish accurate sample timing in a digital demodulator which forms part of an orthogonally multiplexed parallel data transmission system, two second-order PLLs are arranged after a demodulating section of the digital demodulator so as to receive baseband signals of corresponding pilot channels. The two second-order PLLs each includes an integrator. These integrators apply the outputs thereof to a subtracter which applies the subtraction result to a voltage-controlled oscillator in order to establish the accurate sample timing.

10 Claims, 5 Drawing Figures

CIRCUIT FOR ESTABLISHING ACCURATE SAMPLE TIMING

BACKGROUND OF THE INVENTION

1. Field of The Invention

The present invention relates to a circuit for establishing accurate sample timing, and more specifically to such a circuit for use in a digital demodulator which forms part of an orthogonally multiplexed QAM (quadrature amplitude modulation) system. The accurate sample timing (or clock recovery) is assured by correcting the offsets of a preset sampling frequency and a preset sampling phase through the use of control loops provided in the demodulator.

2. Description of the Prior Art

It is known in the art that an orthogonally multiplexed parallel data transmission system allows spectrum overlappings within a predetermined bandwidth, and hence attains a very high data transmission efficiency close to the efficiency of the ideal Nyquist transmission. Such a transmission system therefore has found demand in arrangements wherein very high efficiencies of digital transmission are important.

In such a transmission system, parallel data are transmitted through a plurality of channels by modulating two carrier components 90° apart in phase of each channel, while maintaining the orthogonality of adjacent channels.

In order to recover transmitted baseband signals in the digital demodulator, it is vital to accurately sample received analog signals. The accurate sample timing is assured by eliminating or compensating for sampling frequency and phase offsets within the demodulator. The frequency offset is a phase deviation of a received complex signal, which rotates in phase as a function of time, while the phase offset is a static or time-invariant phase deviation of a received complex signal.

In order to establish the correct sample timing, it is a common practice to utilize phase offset information which is obtained from a tapped delay line type automatic equalizer. This phase offset information is used to control a voltage-controlled oscillator which is adapted to control a sampling frequency (viz., sample timing) of a sampler. More specifically, in the case a sampling phase offset exists, the center tap of the automatic equalizer varies in position. The quantity of sampling phase deviation is detected by means of tap coefficient variations and is fed back, through a control loop, to the voltage-controlled oscillator so as to control same.

The above-mentioned automatic equalizer has been intended to correct static interchannel and intersymbol interferences and to prevent the degradation of a signal-to-noise (S/N) ratio caused by white noise. This is the reason that the control loop gain is set to a small value. Consequently, in the case where a large frequency offset takes place after the system is initially operated (for example), the automatic equalizer is unable to correct the resultant rapid phase shifts because the control loop gain is set to a small value, and hence fails to establish a correct sample timing in such an initial duration (for example).

For further details relating to the principle of an orthogonally multiplexed QAM system and the automatic equalizer for use therein, reference should be had to the article entitled "An Analysis of Automatic Equalizers for Orthogonally Multiplexed QAM Systems", IEEE Transactions on Communications, Vol. Com-28, No. 1, January 1980, PP. 73–83. Further, a Modem (modulator-demodulator) for use in an orthogonally multiplexed QAM system has been disclosed in Japanese patent application No. 55-28740 (laid open under the publication No. 56-125131).

SUMMARY OF THE INVENTION

The object of the present invention is therefore to provide a circuit for establishing accurate sample timing (or clock recovery), which obviate the aforesaid prior art problem.

Another object of the present invention is to provide a circuit for establishing accurate sample timing by effectively eliminating sampling frequency offsets and sampling phase offsets within a digital demodulator provided for an orthogonally multiplexed parallel data transmission system.

An aspect of the present invention takes the form of a circuit for establishing accurate sample timing by correcting sampling frequency offsets and sampling phase offsets, the circuit forming part of a demodulator for an orthogonally multiplexed parallel data transmission system, the demodulator including a demodulating section which receives the orthogonally multiplexed parallel data to recover baseband signals of corresponding parallel channels which consist of data and pilot channels, the circuit comprising: a first second-order PLL which includes a first integrator, the first second-order PLL being arranged after the demodulating section so as to receive a recovered baseband signal of a first pilot channel; a second second-order PLL which includes a second integrator, the second second-order PLL being arranged after the demodulating section so as to receive a recovered baseband signal of a second pilot channel; a subtracter which is supplied with the outputs of the first and second integrators and which produces the subtraction result as sampling frequency offset information; and a voltage-controlled oscillator which receives the output of the subtracter so as to establish the accurate sample timing.

Another aspect of the present invention takes the form of a circuit for establishing accurate sample timing by correcting sampling frequency offsets and sampling phase offsets, the circuit forming part of a demodulator for an orthogonally multiplexed parallel data transmission system, the demodulator including a demodulating section which receives the orthogonally multiplexed parallel data to recover baseband signals of corresponding parallel channels which consist of data and pilot channels, the circuit comprising: a first second-order PLL which includes a first integrator, the first second-order PLL being arranged after the demodulating section so as to receive a recovered baseband signal of a first pilot channel; a second second-order PLL which includes a second integrator, the second second-order PLL being arranged after the demodulating section so as to receive a recovered baseband signal of a second pilot channel; a subtracter which is supplied with the outputs of the first and second integrators and which produces the subtraction result as sampling frequency offset information; a plurality of automatic equalizers which are allotted to the data channels inclusive of the center channel of the parallel channels, the plurality of automatic equalizers producing sampling phase offset information; an adder which adds the sampling frequency offset information and the sampling phase offset information; and a voltage-controlled oscillator which receives the output of the adder so as to establish the accurate sample timing.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 1:
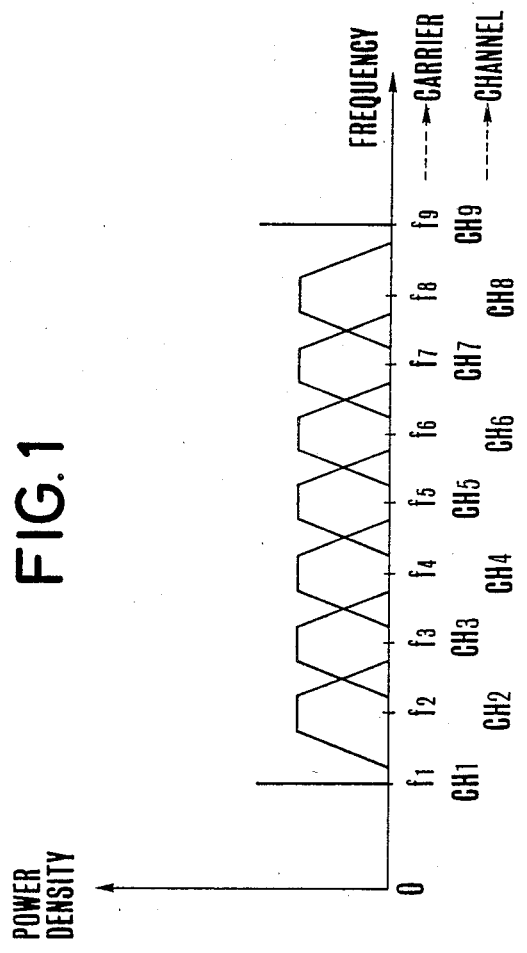
FIG. 1 shows the spectrum of received orthogonally multiplexed QAM signals which are transmitted through a plurality of parallel channels.

FIG. 1 shows the spectrum of nine QAM signals received respectively through corresponding nine parallel channels CH1-CH9, wherein the two end channels CH1 and CH9 are utilized as first and second pilot channels and the remaining seven channels CH2-CH8 as data channels. It is preferable to select the two end channels as the pilot channels in that these channels are subject to various distortions resulting in signal degradations.

Figure 2:
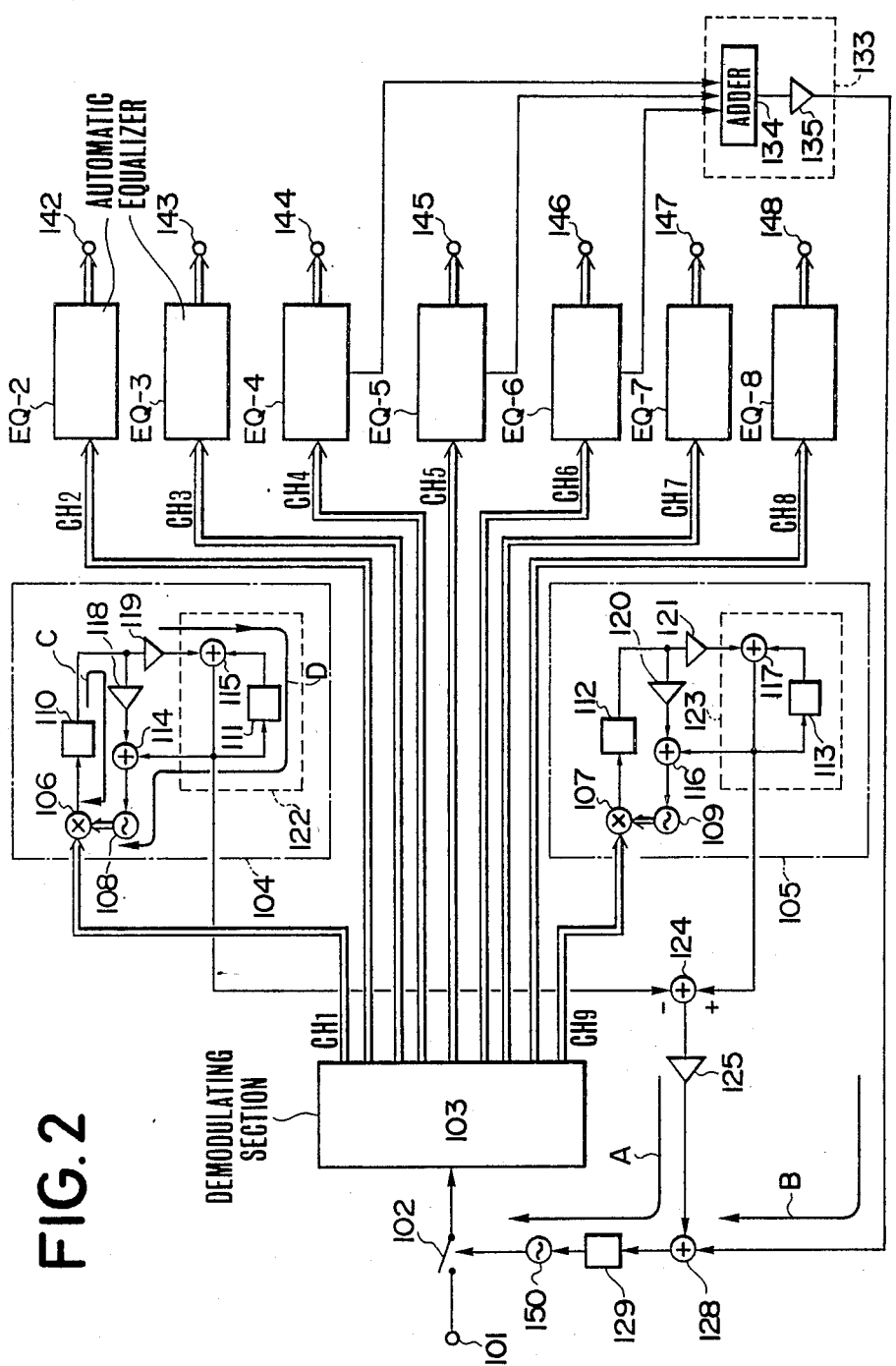
FIG. 2 is a block diagram showing a first embodiment of the present invention, which takes the form of a demodulator for the orthogonally multiplexed QAM system.

FIG. 2 is a block diagram showing a first embodiment of the present invention, which takes the form of a demodulator for the orthogonally multiplexed QAM system.

As shown in FIG. 1, the nine channels include corresponding carriers whose frequencies ($f_1$-$f_9$) are uniformly separated by $1/T$ (wherein T denotes a period of symbol clock pulses or a symbol spacing). Therefore, $1/T$ is a modulating rate of each data channel. The in-phase and quadrature components (real and imaginary parts) of each carrier are independently modulated, while the orthogonality between the adjacent channels is maintained. It should be noted that (a) one of the two quadrature component data of each pilot channel is unmodulated and (b) the other data thereof is not transmitted. Each pilot channel shown in FIG. 1 has therefore no spectrum. It is assumed in this specification that (a) the in-phase component data of each pilot channel is unmodulated and (b) the quadrature component data thereof is not transmitted.

FIG. 2 arrangement comprises a demodulating section 103 for recovering a plurality of complex baseband signals, two second-order phase-locked loops (PLL) 104 and 105 which are provided after the demodulating section 103, a subtracter 124 adapted to produce a difference between the outputs of the second-order PLLs 104 and 105, a loop amplifier 125, an adder 128, a digital-to-analog converter (DAC) 129, a voltage-controlled oscillator (VCO) 150, a sampler 102 which is arranged between an input terminal 101 and the section 103 and which is controlled by the VCO 150, automatic equalizers EQ-2 through EQ-8 the outputs of which are respectively derived from terminals 142 through 148, and an averaging circuit 133 consisting of an adder 134 and an amplifier 135, wherein each double line denotes a complex signal line. First and second control loops A and B, are respectively provided for correcting sampling frequency and phase offsets, wherein the control loop A is directly concerned with the present invention and will be discussed in detail hereinlater.

The second-order PLL 104 is arranged to receive the first pilot channel output of the demodulating section 103 and includes two control loops C and D, as shown. The control loop C includes a multiplier (or phase rotator) 106, a delay element 110, a loop amplifier 118, an adder 114 and a VCO 108. On the other hand, the loop D includes the multiplier 106, the delay element 110, another loop amplifier 119, an integrator 122 consisting of an adder 115 and a delay element 111, the adder 114 and the VCO 108. Each of the delay elements 110 and 111 allows the input signal thereto to be delayed by one sampling time interval. The control loop C is adapted to rapidly compensate for a static phase offset of the carrier, while the control loop D is arranged to rapidly compensate for a time-dependent phase offset which is caused by an abrupt carrier frequency offset.

If no frequency and phase offsets exist, each output of the VCO 108 and the multiplier 106 remains zero in phase. Whilst, in case the output of the multiplier 106 deviates from zero in phase, this output, which is applied to the amplifiers 118 and 119 by way of the delay element 110, is utilized to correct the above-mentioned offsets. The amplifier 118 applies the output thereof to the VCO 108 via the adder 114, thereby to correct the static phase offset of the carrier by controlling the oscillating frequency of the VCO 108.

With reference to the control loop D, the integrator 122 is supplied with the output of the amplifier 119, and integrates or successively adds the outputs. The integrator 122 applies the output thereof to the VCO 108 via the adder 114. Assuming that the carrier of the first pilot channel (CH1) is frequency deviated, then the input applied to the multiplier 106 rotates in phase with the shifted frequency. In this instance, the integrator 122 successively adds the outputs of the loop amplifier 119 up to the value which corresponds to the deviated frequency, and hence serves to compensate for the abrupt carrier frequency offset by controlling the VCO 108.

As shown, the second-order PLL 104 does not includes such a low-pass filter that delays a signal applied thereto by a considerable amount of time, so that each gain of the loop amplifiers 118 and 119 can be set to a high value. This means that the abrupt phase offsets are able to be rapidly corrected through the use of the control loops C and D.

Another second-order PLL 105 is arranged to receive the second pilot channel and is configured in substantially the same manner as that of the above-mentioned PLL 104, wherein the blocks of the former arrangement 107, 109, 112, 113, 116, 117, 120, 121 and 123 corresponds to the blocks of the latter arrangement 106, 108, 110, 111, 114, 115, 118, 119 and 122, respectively. Additionally, the two PLLs 104 and 105 function in substantially the same manner, so that the PLL 105 will not be described in detail so as to avoid any unnecessary redundancy.

Assuming that the two second-order PLLs 104 and 105 are in phase locking states respectively, then each output of the integrators 122 and 123 indicates a value of a frequency offset. It should be noted, however, that each output includes the following information: (a) a frequency offset ($\omega_c$) of the corresponding carrier, which is caused within a transmittion medium and (b) a timing frequency offset ($\omega_t$) introduced during the data sampling operations. More specifically, denoting the ratios of the modulating rate to the two pilot frequencies by $k_1$ and $k_2$ respectively, the outputs of the integrators 122 and 123 ($\omega_1$ and $\omega_2$) are given:

$$\omega_1 = \omega_c + k_1 \cdot \omega_t$$

$$\omega_2 = \omega_c + k_2 \cdot \omega_t$$

Consequently, the output of the subtracter 124 is:

$$\omega_2 - \omega_1 = (k_2 - k_1) \cdot \omega_t$$

It is therefore understood that any large deviation of the sampling frequency can rapidly be corrected by applying the output of the subtracter 124 to the VCO 150 via the D/A converter 129. In other words, the frequency offsets, which causes the deviation of sampling frequency, can be eliminated through the use of the control loop A.

The control loop B is provided for correcting the sampling phase offset by utilizing the offest information derived from the automatic equalizer. Such a technique has been disclosed in the article entitled "Fractional Tap-Spacing Equalizer and Consequences for Clock Recovery in Data Modems", IEEE Transactions on communications, Vol. COM-24, No. 8, August 1976, pp. 856–864. The present invention, however, presents another remarkable advantages, when combined with the above-mentioned prior art, that both the sampling phase and frequency offsets can be eliminated.

As shown in FIG. 2, the control loop B includes the three adjacent automatic equalizers EQ-4, EQ-5 and EQ-6 which are allotted to the center data channel (CH5) and the adjacent data channels thereof (CH4 and CH6). This equalizer selection arises from the fact that these channels are not liable to be degraded as compared with the other channels.

Figure 3:
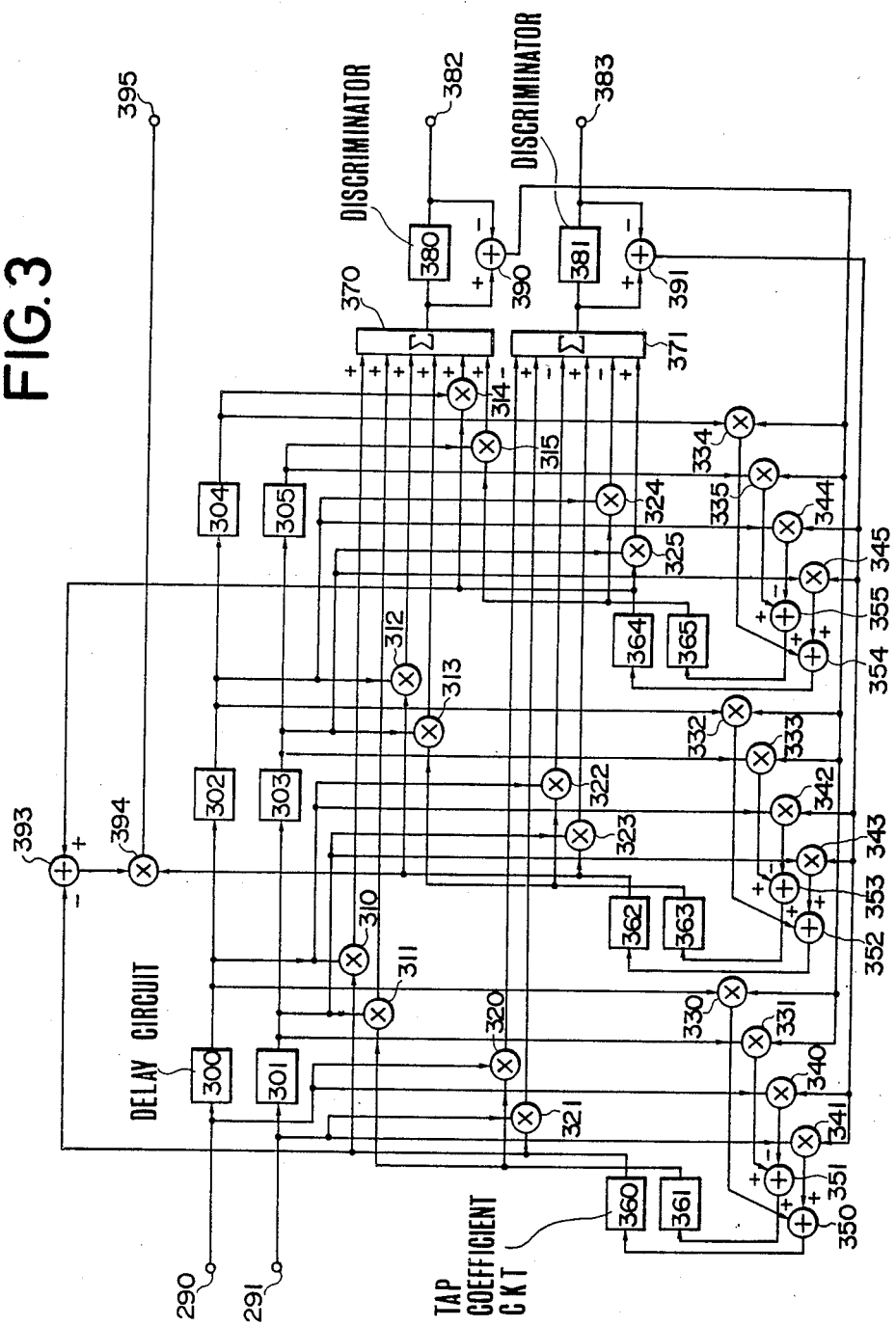
FIG. 3 is a block diagram showing a known transversal filter type automatic equalizer which forms part of the FIG. 2 arrangement.

Referring to FIG. 3, there is shown, in block diagram form, one detailed arrangement of a conventional automatic equalizer which is applicable to the FIG. 2 arrangement. It should be noted that the automatic equalizer shown in FIG. 3 is one of the even channels.

Although not shown in FIG. 3, the input complex data is previously sampled with a period of T/2. A real part data sequence is applied through an input terminal 290 to delay circuits (or shift registers) 300, 302 and 304 in this order. Similarly, an imaginary part data sequence is applied through an input terminal 291 to delay circuits 301, 303, 305 in this order. Each delay circuit permits the input data thereto to be delayed by T/2 seconds.

As shown, the real part data which is applied to the delay circuit 300, is also applied to a multiplier 320. The outputs of the delay circuits 300, 302, 304, 301, 303, 305 are tapped off and applied to multipliers 310, 312, 314, 311, 313, 315, respectively. The multipliers 310 through 315 multiply the outputs of the associated delay circuits with the outputs of tap coefficient circuits 360 through 365, and thence supply an adder 370 with the products or the results thereof. The adder 370 produces the sum of the inputs thereto which is applied to a discriminator 380. In a similar manner, multipliers 320 through 325 multiply the outputs of the associated delay circuits with the outputs of the tap coefficient circuits 360 through 365, and thence supply another adder 371 with the products thereof. The adder 371 produces the sum of the inputs thereto which is applied to a discriminator 381.

The discriminator 380 applies the output thereof to an error detector 390, while this error detector 390 receives the output of the adder 370 and produces an error signal of the real part data, wherein each of the discriminator 380 and the error detector 390 produces the output thereof every time interval of T. Similarly, the discriminator 381 applies the output thereof to an error detector 391, while this error detector 391 is supplied with the output of the adder 371 and produces an error signal of the imaginary part data. Each of the discriminator 381 and the error detector 391 produces the output thereof every time interval of T. It should be noted that there exists a time difference of T/2 between the output timings of discriminators 380 and 381 and also between the output timings of the error detectors 390 and 391.

The error detector 390 supplies the error signal thereof to multipiers 330, 331, 332, 333, 334 and 335, while the error detector 391 supplies the error signal thereof to multipiers 340, 341, 342, 343, 344 and 345. These multipliers 330 through 345, together with associated adders 350 through 355, control the weighting values of the tap coefficient circuits 360 through 365. The operation of the above-mentioned equalizer will not be described, in that it is understandable by those skilled in the art and the detailed discussion thereof will depart from the aspect of the second embodiment.

As shown in FIG. 3, the outputs of the tap coefficient circuits 360 and 364 are applied to a subtracter 393 which produces the difference therebetween and applies the result to a multiplier 394. The output of the multiplier 394 is the information of the sampling phase offset which is applied via a terminal 395 to the adder 134 (FIG. 2).

Turning to FIG. 2, the adder 134 is supplied with the outputs of the three automatic equalizers EQ-4, EQ-5 and EQ-6. The amplifier 135 amplifies the output of the adder 134 and thence applies same to the adder 128. This adder 128 is adapted to add the outputs of the amplifiers 125 and 135, so that it is readily understood that the FIG. 2 arrangement is able to rapidly correct the sampling frequency offset (which usually occurs during the incipient operation of the system) and thereafter (or concurrently) is able to compensate for the sampling phase offset.

Figure 4:
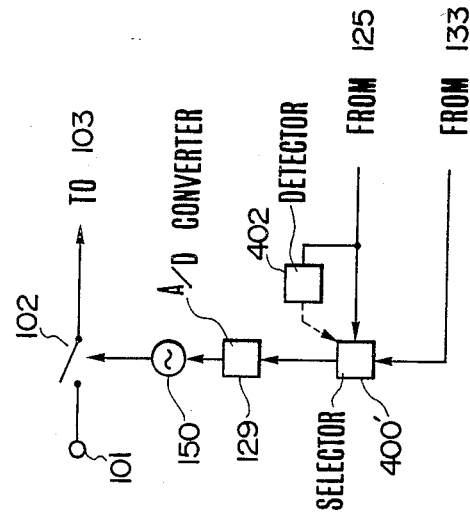
FIG. 4 is a block diagram showing a second embodiment of the present invention in a simplified manner in order to avoid any unnecessary redundancy.

FIG. 4 is a block diagram showing a second embodiment of the present invention, which is analogous to the first embodiment and hence is illustrated with respect to only the portion pertinent to the second embodiment. Comparison of the first and second embodiments shows that the former embodiment is provided with a selector 400 in place of the adder 128 of the latter embodiment. The selector 400 is adapted to couple the A/D converter 129 to the amplifier 125 during a predetermined period after the system is initially operated. After this period elapses, the selector 400 switches the A/D converter 129 to the averaging circuit 133. Thus, the second embodiment first eliminates the sampling frequency offset and thereafter the sampling phase offset. This is the reason that the sampling frequency offset usually or mostly takes place after the system is initially operated.

Figure 5:
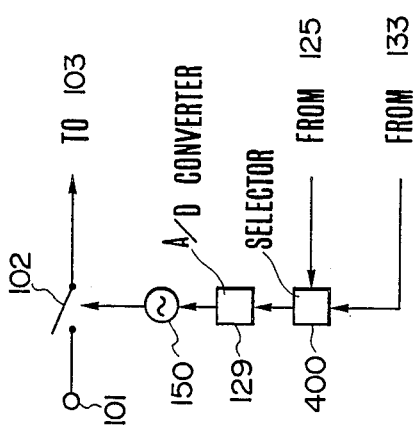
FIG. 5 is a block diagram showing a third embodiment of the present invention in a simplified manner in order to avoid any unnecessary redundancy.

FIG. 5 is a block diagram showing a third embodiment of the present invention, which has the same arrangement as the second embodiment except that (a) a detector 402 is added to the third embodiment and (b) the selector 400 (FIG. 4) is slightly modified (denoted by 400') so as to be controlled by the output of the detector 402. This detector 402 is arranged to detect whether the absolute value of the output of the amplifier 125 exceeds a predetermined value, and, if in excess of the preset value, then the detector 402 allows the selector 400' to couple the A/D converter 129 to the amplifier 125. Otherwise, the detector 402 controls the selector 400' such that the A/D converter 129 is connected to the averaging circuit 133. It is therefore understandable that since the presence of the sampling frequency offset leads to the large output of the amplifier 125, the two kinds of offsets thus far discussed can effectively be corrected.

The foregoing description shows only preferred embodiments of the present invention. Various modifications are apparent to those skilled in the art without departing from the scope of the present invention which is only limited by the appended claims.

What is claimed is:

1. A circuit for establishing accurate sample timing by correcting sampling frequency offsets and sampling phase offsets, said circuit forming part of a demodulator for an orthogonally multiplexed parallel data transmission system, said demodulator including a demodulating section which receives the orthogonally multiplexed parallel data to recover baseband signals of corresponding parallel channels which consist of data and pilot channels, said circuit comprising:
a first second-order PLL which includes a first integrator, said first second-order PLL being arranged after said demodulating section so as to receive a recovered baseband signal of a first pilot channel;
a second second-order PLL which includes a second integrator, said second second-order PLL being arranged after said demodulating section so as to receive a recovered baseband signal of a second pilot channel;
a subtracter which is supplied with the outputs of said first and second integrators and which produces the subtraction result as sampling frequency offset information; and
a voltage-controlled oscillator which receives the output of said subtracter so as to establish the accurate sample timing.

2. A circuit as claimed in claim 1, wherein said first and second pilot channels are the end channels of said parallel channels.

3. A circuit as claimed in claim 1, further including;
a plurality of automatic equalizers which are allotted to the data channels inclusive of the center channel of said parallel channels, said plurality of automatic equalizers producing sampling phase offset information; and
an adder which adds said sampling frequency offset information and said sampling phase offset information, said adder applying the output thereof to said voltage-controlled oscillator.

4. A circuit as claimed in claim 3, wherein said first and second pilot channels are the end channels of said parallel channels.

5. A circuit for establishing accurate sample timing by correcting sampling frequency offsets and sampling phase offsets, said circuit forming part of a demodulator for an orthogonally multiplexed parallel data transmission system, said demodulator including a demodulating section which receives the orthogonally multiplexed parallel data to recover baseband signals of corresponding parallel channels which consist of data and pilot channels, said circuit comprising:
a first second-order PLL which includes a first integrator, said first second-order PLL being arranged after said demodulating section so as to receive a recovered baseband signal of a first pilot channel;
a second second-order PLL which includes a second integrator, said second second-order PLL being arranged after said demodulating section so as to receive a recovered baseband signal of a second pilot channel;
a subtracter which is supplied with the outputs of said first and second integrators and which produces the subtraction result as sampling frequency offset information;
a plurality of automatic equalizers which are allotted to the data channels inclusive of the center channel of said parallel channels, said plurality of automatic equalizers producing sampling phase offset information;
an adder which adds said sampling frequency offset information and said sampling phase offset information; and
a voltage-controlled oscillator which receives the output of said adder so as to establish the accurate sample timing.

6. A circuit as claimed in claim 5, wherein said first and second pilot channels are the end channels of said parallel channels.

7. A circuit for establishing accurate sample timing by correcting sampling frequency offsets and sampling phase offsets, said circuit forming part of a demodulator for an orthogonally multiplexed parallel data transmission system, said demodulator including a demodulating section which receives the orthogonally multiplexed parallel data to recover baseband signals of corresponding parallel channels which consist of data and pilot channels, said circuit comprising:
a first second-order PLL which includes a first integrator, said first second-order PLL being arranged after said demodulating section so as to receive a recovered baseband signal of a first pilot channel;
a second second-order PLL which includes a second integrator, said second second-order PLL being arranged after said demodulating section so as to receive a recovered baseband signal of a second pilot channel;
a subtracter which is supplied with the outputs of said first and second integrators and which produces the subtraction result as sampling frequency offset information;
a plurality of automatic equalizers which are allotted to the data channels inclusive of the center channel of said parallel channels, said plurality of automatic equalizers producing sampling phase offset information;
a voltage-controlled oscillator which is adapted to control the sample timing;
a selector which allows said sampling frequency offset information to be applied to said voltage-controlled oscillator during a predetermined period after the system is initially operated, and which allows said sampling phase offset information to be applied to said voltage-controlled oscillator after said predetermined period elapses.

8. A circuit as claimed in claim 7, wherein said first and second pilot channels are the end channels of said parallel channels.

9. A circuit for establishing accurate sample timing by correcting sampling frequency offsets and sampling phase offsets, said circuit forming part of a demodulator for an orthogonally multiplexed parallel data transmission system, said demodulator including a demodulating section which receives the orthogonally multiplexed parallel data to recover baseband signals of corresponding parallel channels which consist of data and pilot channels, said circuit comprising:

a first second-order PLL which includes a first integrator, said first second-order PLL being arranged after said demodulating section so as to receive a recovered baseband signal of a first pilot channel;

a second second-order PLL which includes a second integrator, said second second-order PLL being arranged after said demodulating section so as to receive a recovered baseband signal of a second pilot channel;

a subtracter which is supplied with the outputs of said first and second integrators and which produces the subtraction result as sampling frequency offset information;

a plurality of automatic equalizers which are allotted to the data channels inclusive of the center channel of said parallel channels, said plurality of automatic equalizers producing sampling phase offset information;

a voltage-controlled oscillator which is adapted to control the sample timing;

a detector for detecting the absolute value of said sampling frequency offset; and a selector which allows said sampling frequency offset information to be applied to said voltage-controlled oscillator when said detector detects the absolute value in excess of a predetermined value, and which allows said sampling phase offset information to be applied to said voltage-controlled oscillator when the absolute value detected by said detector is less than the predetermined value.

10. A circuit as claimed in claim 9, wherein said first and second pilot channels are the end channels of said parallel channels.

* * * * *